US007804801B2

United States Patent
Lee et al.

(10) Patent No.: US 7,804,801 B2
(45) Date of Patent: Sep. 28, 2010

(54) QR DECOMPOSITION APPARATUS AND METHOD FOR MIMO SYSTEM

(75) Inventors: Yu-Ro Lee, Daejon (KR); Byung-Chan Kim, Goyang-si (KR); Minho Cheong, Daejon (KR); Chanho Yoon, Daejon (KR); Je-Hun Lee, Daejon (KR); Kwhang-Hyun Ryu, Daejon (KR); Cheol-Jung Kim, Daejon (KR); Tae-Hyun Jeon, Seongnam-si (KR); Sok-Kyu Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 298 days.

(21) Appl. No.: 12/131,617

(22) Filed: Jun. 2, 2008

(65) Prior Publication Data

US 2009/0154334 A1    Jun. 18, 2009

(30) Foreign Application Priority Data

Dec. 14, 2007    (KR) .................. 10-2007-0131455

(51) Int. Cl.
*H04W 4/00* (2009.01)
(52) U.S. Cl. ..................................... 370/334
(58) Field of Classification Search ............ 370/334
See application file for complete search history.

(56) References Cited

U.S. PATENT DOCUMENTS

2004/0141566 A1* 7/2004 Kim et al. .................. 375/267

FOREIGN PATENT DOCUMENTS

| KR | 10-2006-0050894 | 5/2006 |
| KR | 10-2006-0108450 | 10/2006 |
| KR | 10-2007-0011304 | 1/2007 |
| KR | 10-2007-0095228 | 9/2007 |

* cited by examiner

*Primary Examiner*—Derrick W Ferris
*Assistant Examiner*—Mang Yeung
(74) *Attorney, Agent, or Firm*—Kile Park Reed & McManus PLLC

(57) ABSTRACT

Provided are a QR decomposition apparatus and method for a MIMO system. The QR decomposition apparatus includes: a norm calculator for calculating a vector size norm for a channel input; a Q column calculator for calculating a column value of a unitary matrix Q by multiplying a delayed channel input with $\sqrt{\text{norm}}$; an R row calculator for receiving the delayed channel input, the output of the Q column calculator, and $1/\sqrt{\text{norm}}$, and calculating a row value of an upper triangular matrix R; a Q update calculator for receiving the delayed channel input, the output of the R row calculator, and a delayed output of the Q column calculator, and calculating a Q update matrix value; and a norm update calculator for receiving a delayed output of the norm calculator and an output of the R row calculator, and outputting a norm update matrix value.

22 Claims, 16 Drawing Sheets

QR DECOMPOSITION APPARATUS AND METHOD FOR MIMO SYSTEM

CROSS-REFERENCE TO RELATED APPLICATIONS

The present invention claims priority of Korean Patent Application No. 10-2007-0131455, filed on Dec. 14, 2007, which is incorporated herein by reference.

BACKGROUND OF THE INVENTION

1. Field of the Invention

The present invention relates to a QR decomposition apparatus and method for a Multiple Input Multiple Output (MIMO) system; and, more particularly, to an QR decomposition apparatus and method for improving performance with computation complexity reduced in an Orthogonal Frequency Division Multiplexing (OFDM) MIMO system.

This work was supported by the IT R&D program of MIC/IITA [2006-S-002-02, "IMT-Advanced Radio Transmission Technology with Low Mobility"].

2. Description of Related Art

It is a requirement of a wireless communication system to transmit a large amount of high quality multimedia data using a limited frequency. As a method for transmitting a large amount of data using a limited frequency, a Multiple Input Multiple Output (MIMO) system was introduced. The MIMO system forms a plural of independent fading channels using multiple antennas at receiving and transmitting ends and transmits different signals through each of multiple transmission antennas, thereby significantly increasing a data transmission rate. Accordingly, the MIMO system can transmit a great deal of data without expansion of a frequency.

However, the MIMO system has a shortcoming that the MIMO system is weak to inter-symbol interference (ISI) and frequency selective fading. In order to overcome the shortcoming, an Orthogonal Frequency Division Multiplexing (OFDM) scheme was used. The OFDM scheme is a modulation scheme most appropriate for transmitting data at a high speed. The OFDM scheme transmits one data row through a subcarrier having a low data transmission rate.

A channel environment for wireless communication has multiple paths due to obstacles such as a building. In a wireless channel environment having multi-paths, delay spread occurs due to the multiple paths. If delay spread time is longer than a symbol transmission interval, inter-symbol interference is caused. In this case, frequency selective fading occurs in a frequency domain. In case of using a single carrier, an equalizer is used to remove the ISI. However, complexity of the equalizer increases as a data transmission rate increases.

The shortcomings of the MIMO system can be attenuated using an Orthogonal Frequency Division Multiplexing (OFDM) technology. In order to overcome the shortcomings of the MIMO system while maintaining the advantages of the MIMO system, an OFDM technology was applied to a MIMO system having N transmission antennas and N reception antennas. That is, a MIMO-OFDM system was introduced.

FIGS. 1A and 1B are block diagrams schematically illustrating an MIMO OFDM system. FIG. 1A is a block diagram of a transmitting end in the MIMO-OFDM system, and FIG. 2 is a block diagram of a receiving end in the MIMO-OFDM system.

Referring to FIG. 1A, the transmitting side includes a serial-to-parallel (S/P) converter, a plurality of encoders 102, a plurality of Quadrature Amplitude Modulation (QAM) mappers 103, a plurality of Inverse Fast Fourier Transform (IFFT) units 104, a plurality of cyclic prefix (CP) inserters 105, and digital-to-analog conversion (DAC) and radio frequency (RF) unit 106. The S/P converter divides transmission data into a plurality of data rows before encoding the transmission data.

The encoders 102 encode the data rows, respectively. After encoding, the QAM mappers 103 modulate the encoded data rows based on a predetermined modulation scheme such as Binary Phase Shift Keying (BPSK), Quadrature Phase Shift Keying (QPSK), 16 QAM, and 64 QAM. The IFFT units 104 transform the modulated symbols into time domain signals, respectively. The CP inserters 105 insert a CP code for a guard interval into the time domain signals. Then, the DAC & RF unit 106 convert the CP inserted digital signals to analog signals and covert the analog signals to RF signals. The RF signals are transmitted through an antenna.

Referring to FIG. 1B, the receiving part includes a plurality of analog-to-digital conversion (ADC) and RF units 107, a plurality of CP removers 108, a plurality of Fast Fourier Transform (FFT) units 109, an MIMO receiver, a plurality of decoders 111, and a parallel-to-serial (P/S) converter 112. The ADC & RF units 107 convert RF signals into analog signals and convert the analog signals into digital signals. The CP removers 108 remove CP codes which were inserted for a guard interval and transfer the CP code-removed signals to the FFT units 109.

The FFT units 109 perform FFT on the input parallel signals which are the CP removed signals. The MIMO receiver 110 estimates transmission data symbols which are generated by FFT. The MIMO receiver 110 calculates a log likelihood ratio (LLR) from the estimated symbols. The decoders 111 decode data rows transferred from the MIMO receiver 110 and estimate the transmission data, respectively. The of P/S converters 112 convert parallel data modulated by each decoder 111 into serial data.

The MIMO receiver 110 generally uses a decision feedback equalizer (DFE), zero forcing (ZF), minimum mean square error estimation (MMSE), and bell labs layered space-time (BLAST).

In the MIMO wireless communication system, each of the signals transmitted through a plurality of antennas is received with the influence of individual channel. A received signal r of a predetermined subcarrier may be expressed as Eq. 1.

$$r = Hx + n \qquad \text{Eq. 1}$$

In Eq. 1, r is a received signal vector $$r = \begin{bmatrix} r_0 \\ r_1 \\ r_2 \\ \vdots \\ r_n \end{bmatrix}.$$

In general, the number of antennas for receiving a signal is equal to or larger than the number of antennas for transmitting a signal. A channel matrix H is a matrix formed of a wireless channel between antennas for transmission and antennas for reception. The channel matrix H is shown below. Here, the number of antennas for receiving a signal is n+1, and the number of antennas for transmitting a signal is m+1.

$$H = \begin{bmatrix} h_{0,0} & h_{0,1} & h_{0,2} & h_{0,3} & \cdots & h_{0,M} \\ h_{1,0} & h_{1,1} & h_{1,2} & h_{1,3} & \cdots & h_{1,M} \\ h_{2,0} & h_{2,1} & h_{2,2} & h_{2,3} & \cdots & h_{2,M} \\ h_{3,0} & h_{3,1} & h_{3,2} & h_{3,3} & \cdots & h_{3,M} \\ \vdots & \vdots & \vdots & \vdots & \ddots & \vdots \\ h_{n,0} & h_{n,1} & h_{n,2} & h_{n,3} & \cdots & h_{n,m} \end{bmatrix}$$

X is a transmitted signal vector and expressed as $$x = \begin{bmatrix} x_0 \\ x_1 \\ \vdots \\ x_m \end{bmatrix},$$

and n is a noise signal of an antenna for receiving a signal and expressed as $$n = \begin{bmatrix} n_0 \\ n_1 \\ n_2 \\ \vdots \\ n_n \end{bmatrix}.$$

QR decomposition for the channel matrix H can be expressed as Eq. 2.

$$R = 0, Q = H \qquad \text{Eq. 2}$$

for $i = 1, \ldots, n_T$ $$\text{norm}_i = \|q_i\|^2$$

end for $i = 1, \ldots, n_T$ $$r_{i,i} = \sqrt{\text{norm}_i}$$

$$q_i := q_i / r_{i,i}$$

for $k = i+1, \ldots, n_T$ $$r_{i,k} = q_i^H \cdot q_k$$

$$q_k := q_k - r_{i,k} \cdot q_i$$

$$\text{norm}_k := \text{norm}_k - r_{i,k}^2$$

end end

After QR decomposition, the received signal can be expressed as Eq. 3.

$$r = QRx + n \qquad \text{Eq. 3}$$

In Eq. 3, Q is a unitary matrix ($Q^H Q = I$), and expressed as follows.

$$Q = \begin{bmatrix} q_{0,0} & q_{0,1} & q_{0,2} & q_{0,3} & \cdots & q_{0,n} \\ q_{1,0} & q_{1,1} & q_{1,2} & q_{1,3} & \cdots & q_{1,n} \\ q_{2,0} & q_{2,1} & q_{2,2} & q_{2,3} & \cdots & q_{2,n} \\ q_{3,0} & q_{3,1} & q_{3,2} & q_{3,3} & \cdots & q_{3,n} \\ \vdots & \vdots & \vdots & \vdots & \ddots & \vdots \\ q_{n,0} & q_{n,1} & q_{n,2} & q_{n,3} & \cdots & q_{n,n} \end{bmatrix}$$

R denotes an upper triangular matrix and is expressed as follows.

$$R = \begin{bmatrix} r_{0,0} & r_{0,1} & \cdots & r_{0,m} \\ 0 & r_{1,1} & \cdots & r_{1,m} \\ \vdots & \vdots & \ddots & \vdots \\ 0 & 0 & \cdots & r_{m,m} \\ 0 & 0 & \cdots & 0 \\ \vdots & \vdots & \ddots & \vdots \\ 0_{n,0} & 0_{n,1} & \cdots & 0_{n,m} \end{bmatrix}$$

A new received signal vector y can be expressed as Eq. 4.

$$y = Q^H r = Q^H QRx + Q^H n = Rx + \tilde{n} \qquad \text{Eq. 4}$$

$$\begin{bmatrix} y_0 \\ y_1 \\ y_2 \\ y_3 \\ \vdots \\ y_n \end{bmatrix} = \begin{bmatrix} r_{00} & r_{01} & r_{02} & r_{03} & \cdots & r_{0n} \\ 0 & r_{11} & r_{12} & r_{13} & \cdots & r_{1n} \\ 0 & 0 & r_{22} & r_{23} & \cdots & r_{2n} \\ 0 & 0 & 0 & r_{33} & \cdots & r_{3n} \\ \vdots & \vdots & \vdots & \vdots & \ddots & \vdots \\ 0 & 0 & 0 & 0 & \cdots & r_{mn} \end{bmatrix} \begin{bmatrix} x_0 \\ x_1 \\ x_2 \\ x_3 \\ \vdots \\ x_n \end{bmatrix} + \begin{bmatrix} \tilde{n}_0 \\ \tilde{n}_1 \\ \tilde{n}_2 \\ \tilde{n}_3 \\ \vdots \\ \tilde{n}_n \end{bmatrix}$$

Since the received signal y is expressed as multiplication of the upper triangular matrix R and the transmitted signal x in Eq. 4, computation amount is considerably reduced for restoring a received signal. However, the described QR decomposition method may have a problem in that computation amount significantly increases for decomposing a channel H if the number of antennas constantly as seen in Eq. 2. That is, a hardware structure becomes complicated because the number of multipliers increases, and computation complexity also increases.

SUMMARY OF THE INVENTION

An embodiment of the present invention is directed to providing a QR decomposition apparatus and method for a Multiple Input Multiple Output (MIMO) system, which share multipliers, adders, and subtractors for simplifying a hardware structure.

Another embodiment of the present invention is directed to providing a QR decomposition apparatus and method for a MIMO system and a calculator for the QR decomposition apparatus, which reduce computation complexity and effectively use hardware by reducing the number of bits used in a multiplier using a floating point number processing method.

In accordance with an aspect of the present invention, there is provided a QR decomposition apparatus for an MIMO system, including: a norm calculating unit for calculating a vector size norm for a channel input; a Q column calculating unit for calculating a column value of a unitary matrix Q by multiplying a delayed channel input with $\sqrt{\text{norm}}$; an R row calculating unit for receiving the delayed channel input, the output of the Q column calculating unit, and $1/\sqrt{\text{norm}}$, and calculating a row value of an upper triangular matrix R; a Q update calculating unit for receiving the delayed channel input, the output of the R row calculating unit, and a delayed output of the Q column calculating unit, and calculating a Q update matrix value; and a norm update calculating unit for receiving a delayed output of the norm calculating unit and an output of the R row calculating unit, and outputting a norm update matrix value.

The QR decomposition apparatus may further include a first memory unit for receiving an output of the norm calculating unit and outputting the $\sqrt{\text{norm}}$ using a lookup table; and a second memory unit for receiving an output of the norm calculating unit and outputting the $1/\sqrt{\text{norm}}$ using a lookup table.

The QR decomposition apparatus may further include a first delay unit for delaying and outputting the channel input; a second delay unit for delaying and outputting an output of the norm calculating unit; and a third delay unit for delaying and outputting an output of the Q column calculating unit.

In accordance with another aspect of the present invention, there is provided a QR decomposition method for a MIMO system, including: calculating a vector size norm for a channel input; calculating a column value of a unitary matrix Q using a delayed channel input and $\sqrt{\text{norm}}$; calculating a row value of an upper triangular matrix R using the delayed channel input, the calculated column value of the unitary matrix Q, and $1/\sqrt{\text{norm}}$; calculating a Q update matrix value using the delayed channel input, the calculated row value of the upper triangular matrix R, and a delayed column value of the unitary matrix Q; and calculating a norm update matrix value using a delayed norm value and the calculated row value of the triangular matrix value.

In accordance with still another aspect of the present invention, there is provided a calculator for a QR decomposition apparatus in a MIMO system including: a plurality of fixed to floating point number converting unit for converting a fixed point number type input to a floating point number type; a calculating unit for performing a predetermined operation using only a significant value outputted from each of the plurality of fixed to floating point number converting unit; an adding unit for adding exponent values outputted from the plurality of fixed to floating point number converting unit; and a floating to fixed point number converting unit for converting a floating point number type to a fixed point number type using the result of the predetermined operation and the added exponent value.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 1A:
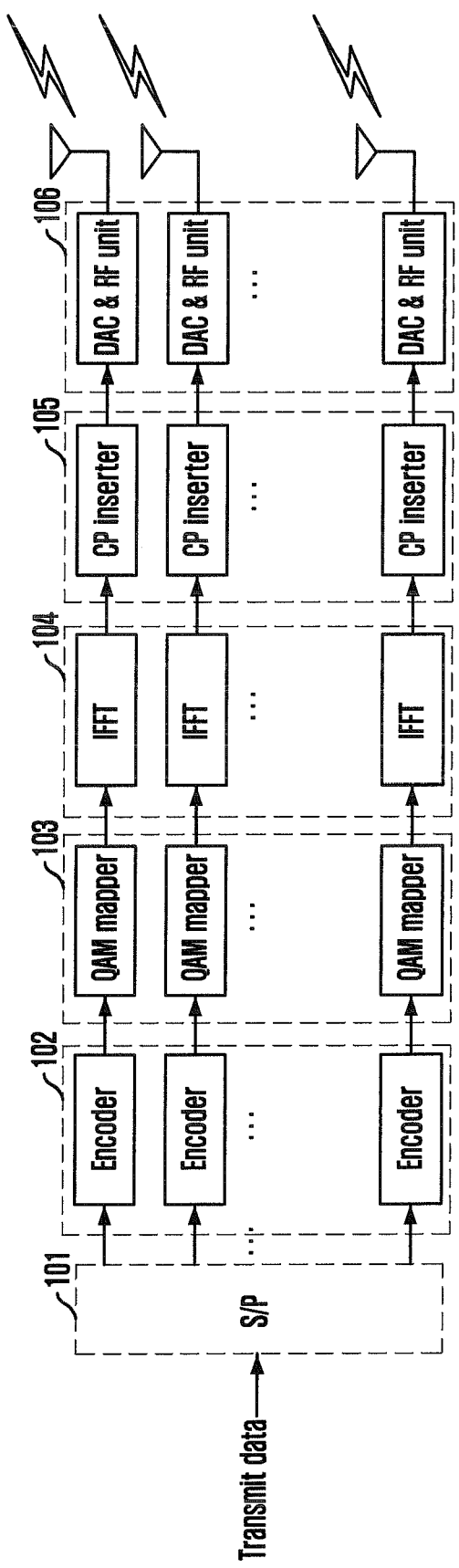
FIGS. 1A and 1B are block diagrams schematically illustrating a Multiple Input Multiple Output (MIMO) Orthogonal Frequency Division Multiplexing (OFDM) system.
Figure 1B:
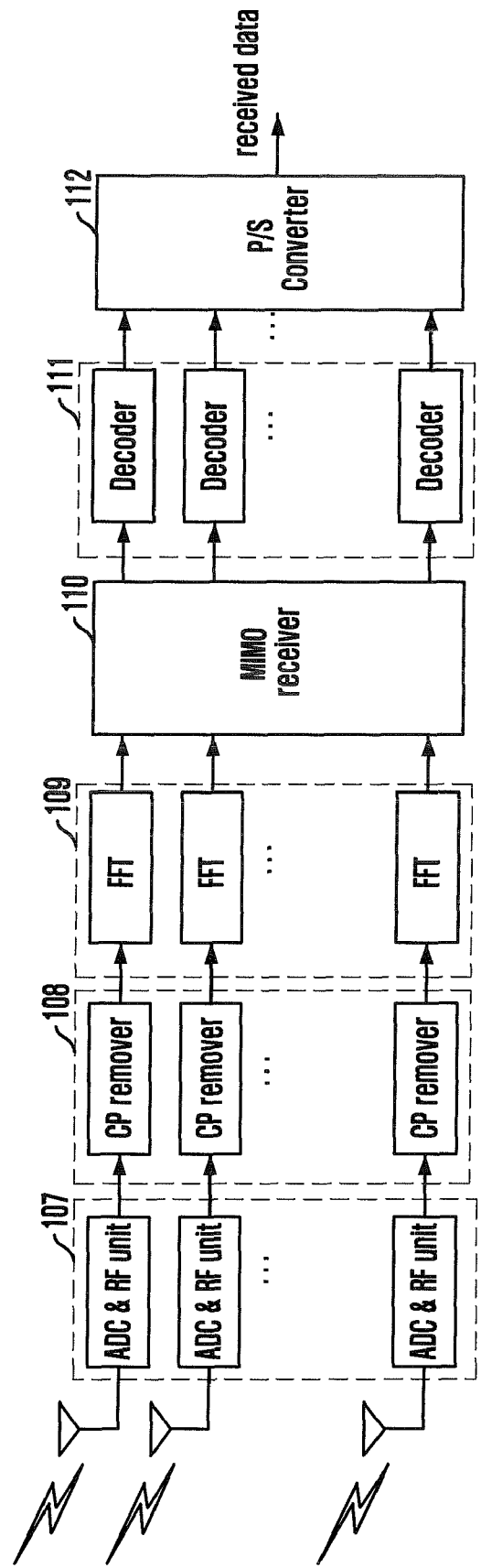
Figure 2:
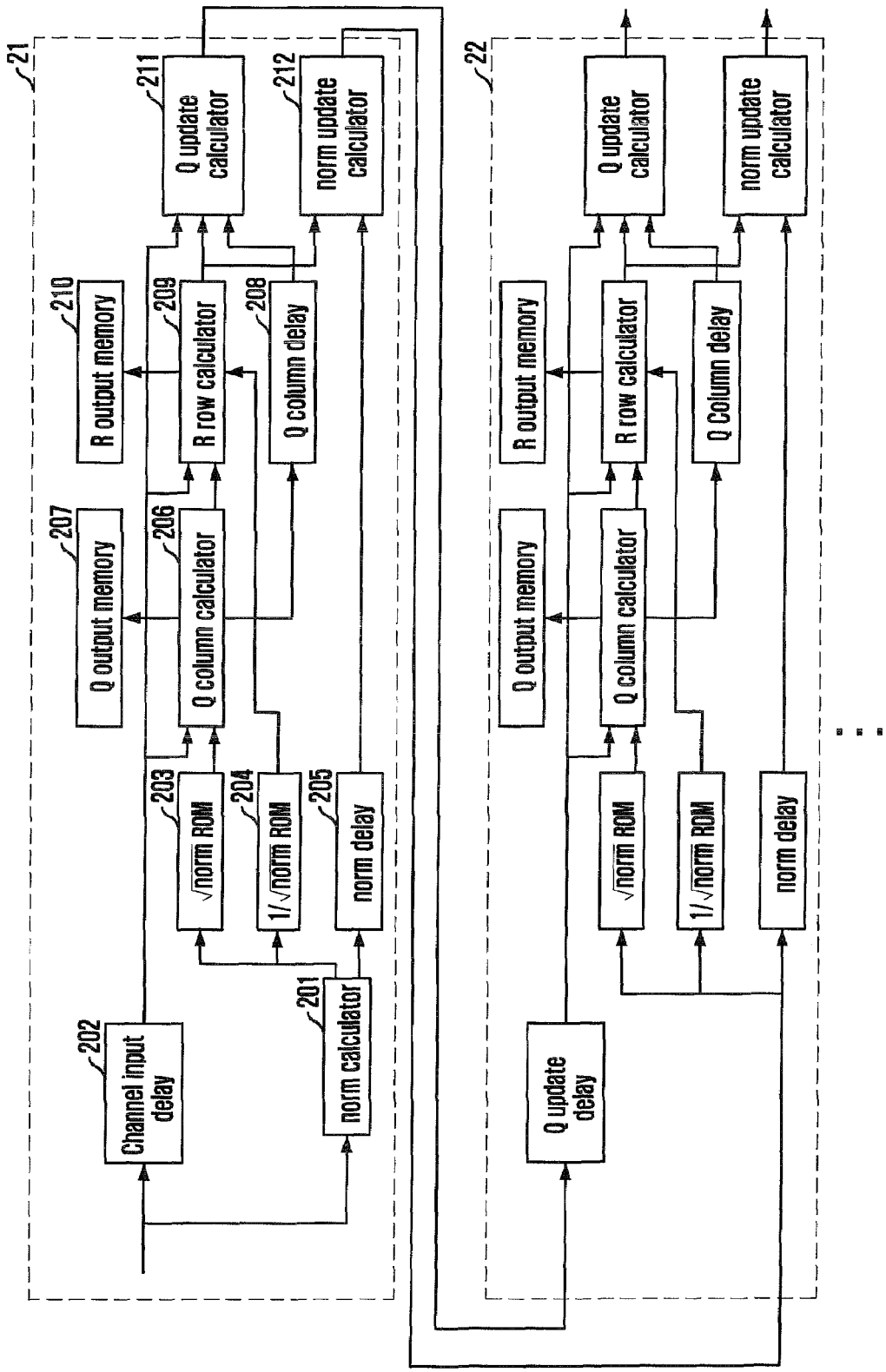
FIG. 2 is a block diagram illustrating a QR decomposition apparatus in accordance with an embodiment of the present invention.

FIG. 2 is a block diagram illustrating a QR decomposition apparatus in accordance with an embodiment of the present invention.

Referring to FIG. 2, the QR decomposition apparatus according to the present embodiment includes a norm calculator 201, a channel input delay 202, lookup table ROMs 203 and 204, a norm delay 205, a Q column calculator 206, a Q output memory 207, a Q column delay 208, an R row calculator 209, an R output memory 210, a Q update calculator 211, and a norm update calculator.

The norm calculator 201 receives channel input after Fast Fourier Transform (FFT) and calculates a vector size norm for $q_i$ through $\text{norm}_i = \|q_i\|^2$. The channel input delay 202 delays the channel input $q_i$ in order to use the channel input for calculating a column value of a unitary matrix Q and a row value of an upper triangular matrix R.

The output of the norm calculator 21 is inputted to the lookup table ROMs 203 and 204. Each of the lookup table ROMs 203 and 204 outputs $\sqrt{\text{norm}}$ and $1/\sqrt{\text{norm}}$ through operation $r_{i,j}\sqrt{\text{norm}_i}$. The norm delay 205 delays the output of the norm calculator 201 for updating a norm value to be used at next stage.

The Q column calculator 206 receives the output value of the lookup table ROM 230 and the delayed $q_i$ from the channel input delay 202, performs $q_i := q_i/r_{i,j}$, and outputs a column value of the unitary matrix Q. Hereinafter, a Q column value refers to the column value of the unitary matrix Q.

Since the calculated Q column value from the Q column calculator 206 is a result value of a QR matrix used for decoding a signal received through multiple antennas, the calculated column value is stored in the Q output memory 207. Also, the calculated column value $q_i$ from the Q column calculator 206 is inputted to the Q column delay 208 and delayed to be used for updating the unitary matrix Q at a next stage.

The R row calculator 209 receives the calculated Q column value from the Q column calculator 206, the delayed channel input from the channel input delay 202, and $1/\sqrt{norm}$ from the lookup table ROM 204, and calculates a row value of the upper triangular matrix R through operation $r_{i,j}=q_i^H sq_k$. Hereinafter, a row value of the upper triangular matrix R refers to an R row value. The output value $1/\sqrt{norm}$ from the ROM 204 is used as a diagonal value of an R row. Since the calculated row value ($r_{i,j}$) of the upper triangular matrix R is the first row value of the upper triangle matrix R in the QR decomposition, it is stored in the R output memory 210.

The Q update calculator 211 receives the delayed value from the channel input delay 202, the delayed Q column value from the Q column delay, and the calculated R row value from the R row calculator, and updates a Q value through operation $q_k := q_k - r_{i,j} \times q_i$.

The norm update calculator 212 receives the delayed norm value from the norm delay 205, receives the calculated R row value from the R row calculator, and calculates a norm value through operation $norm_k := norm_k - r_{i,k}^2$.

In a wireless communication system using multiple antennas, a QR decomposition value from the second antenna is calculated through the same processes as described above. Therefore, the output value of the Q update calculator 211 is inputted to a Q update delay of the next stage 22, and the output value of the norm update calculator 212 is inputted to lookup table ROMS at the next stage 22 for calculating $\sqrt{norm}$ and $1/\sqrt{norm}$.

Figure 3:
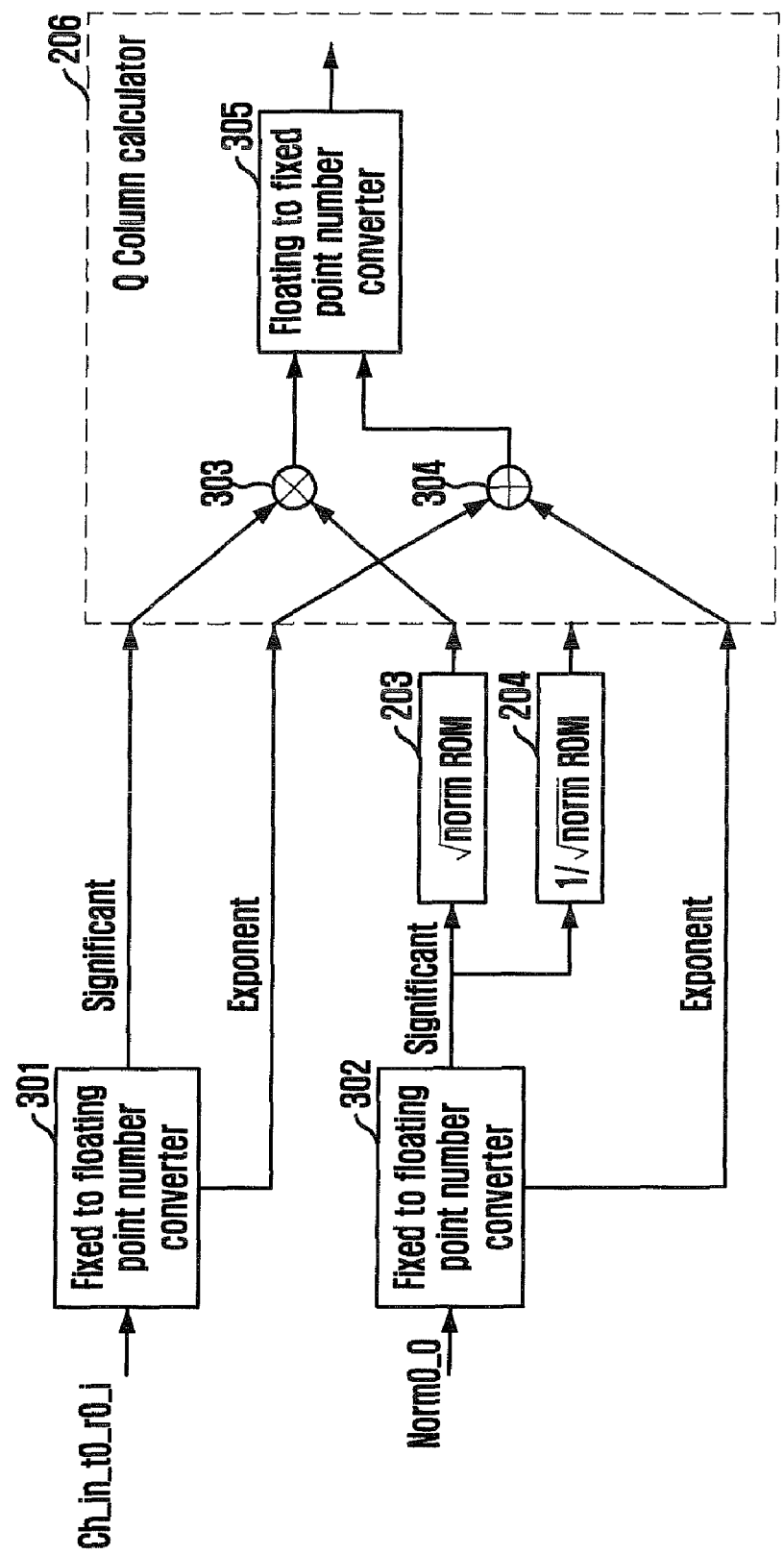
FIG. 3 is a block diagram illustrating a calculator in accordance with an embodiment of the present invention.

FIG. 3 is an exemplary block diagram illustrating a Q column calculator for describing a floating point number processing method in accordance with an embodiment of the present invention.

The QR decomposition is performed through multipliers of many stages and the output of the multipliers need the large number of bits constantly. Therefore, a floating point number processing method is used in the present embodiment instead of using a fixed point number processing method. That is, each of the delayed channel input and the calculated channel input has a value of a fixed point number. If the fixed point number is applied to a multiplier as it is, the number of bits increases too much. It could be heavy burden on hardware.

In order to overcome the problem, the fixed to floating point number converter 301 and 302 and a floating to fixed point number converter 305 are adapted in the present embodiment as shown in FIG. 3. The fixed to floating point number converters 301 and 302 classify a fixed point input value into a significant value and an exponent value.

The multiplier 303 performs multiplication only with the significant value, and the adder 304 adds the exponent value. Then, the floating to fixed point number converter 305 converts the output of the multiplier 303 and the adder 304 into a fixed point value. As described above, the hardware burden is reduced by reducing the number of bits used in the multiplier using the floating point number processing method.

Figure 4:
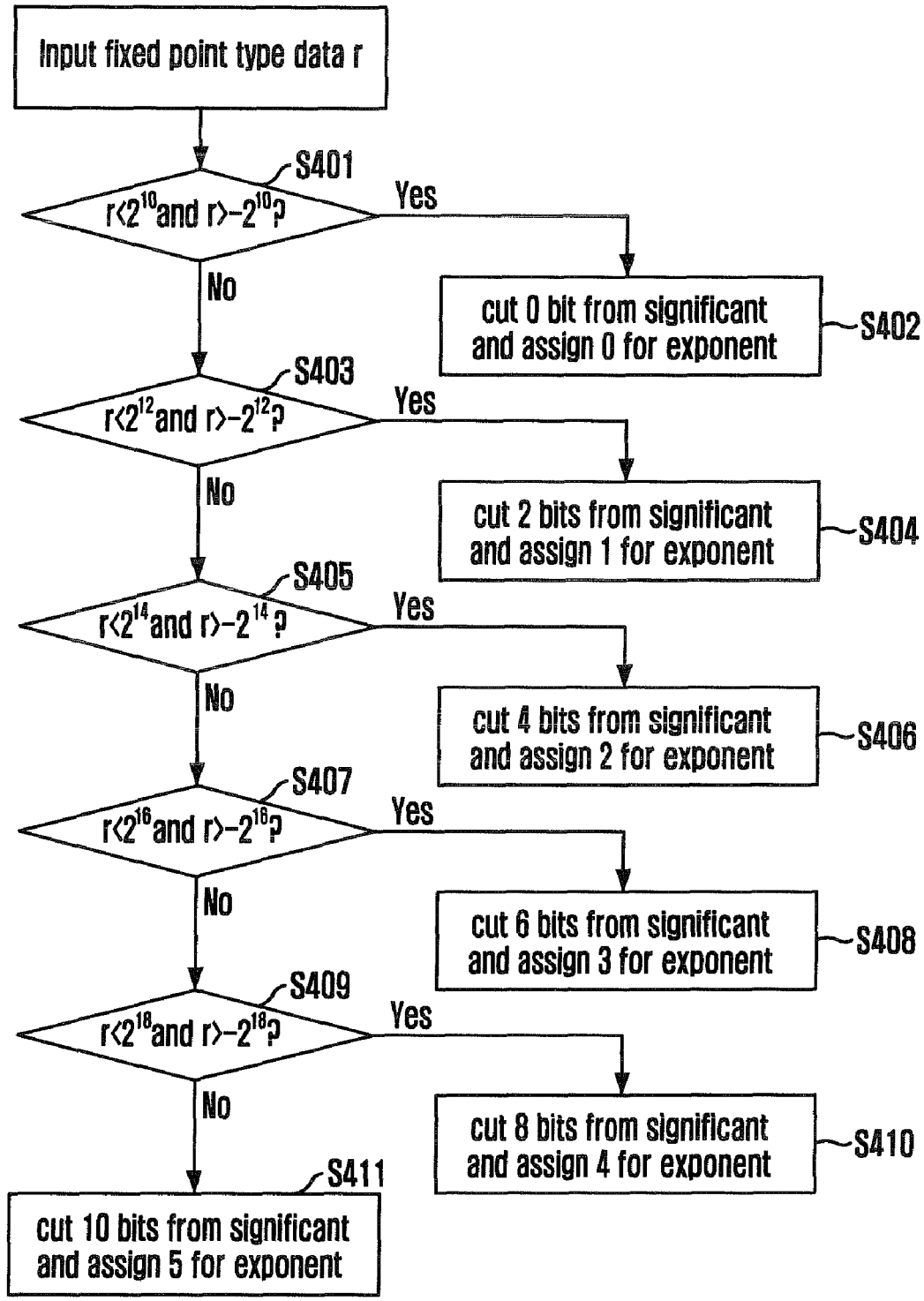
FIG. 4 is a flowchart for describing a method for converting a fixed point number to floating point number in accordance with an embodiment of the present invention.
Figure 5:
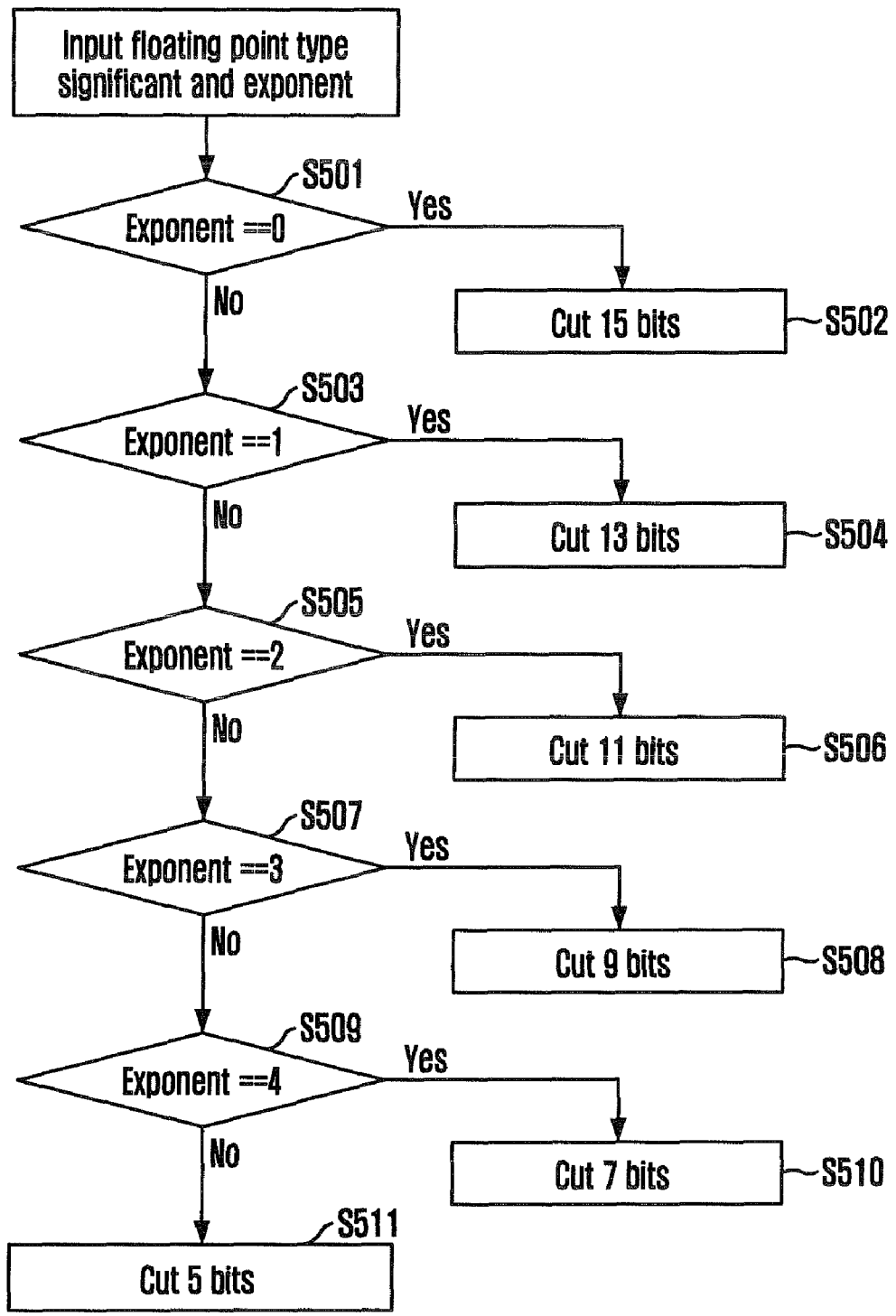
FIG. 5 is a flowchart for describing a method for converting a floating point number to a fixed point number in accordance with an embodiment of the present invention.

FIGS. 4 and 5 are flowcharts describing a method for converting a fixed point number to floating point number and a method for converting a floating point number to a fixed point number in accordance with an embodiment of the present invention.

At first, a process for converting a fixed point number to a floating point number will be described with reference to FIG. 4.

The fixed to floating point number converter receives a fixed point type of 21-bits data r. Then, it is determined whether the data r is smaller than 210 and larger than −210 at step S401. If the data r is smaller than 210 and larger than −210, 0-bit is cut from a significant value and the exponent value is set to 0 at step S402.

If the data r is smaller than 212 and larger than −212 at step s403, 2 bits are cut from the significant value and the exponent value is set as 1 at step S404. Also, if the data r is smaller than 214 and larger than −214 at step S405, 4 bits are cut from the significant value and the exponent value is set to 2 at step S406. If the data r is smaller than 216 and larger than −216 at step S407, 6 bits are cut from the significant value and the exponent value is set to 3 at step S408.

If the data r is smaller than 218 and larger than −218 at step S409, 8 bits is cut from the significant value and the exponent value is set to 4 at step S410. If the data r is smaller than 218 and larger than −218, 10-bit is cut from the significant value and the exponent value is set to 5 at step S411. As described above, the fixed to floating point number converter cuts a predetermined number of bits from the significant value and sets the exponent value to express the cut bits according to input data.

A method for converting a floating point number to a fixed point number according to the present embodiment will be described with reference to FIG. 5. When a floating point number type of a significant value and an exponent value are inputted, for example, 26 bits of significant value and 3 bits of exponent value, the exponent value is checked. If the exponent value is 0 at step S501, 15 bits are cut from the significant value at step S502.

If the exponent value is 1 at step S503, the 13 bits are cut from the significant value at step S504. If the exponent value is 2 at step S505, 11 bits are cut from the significant value at step S506. If the exponent value is 3 at step S507, the 9 bits is cut from the significant value at step S508.

If the exponent value is 4 at step S509, 7 bits are cut from the significant value at step S510. If the exponent value is not 4, the 5 bits are cut from the significant value at step S511. As described above, the floating to fixed point number converter cuts a predetermined number of bits from the significant value according to the exponent value.

Although only multipliers are shown in FIGS. 6, 7, 8, 9, and 10 for convenience, calculates may also include a multiplier for calculating a significant value, an adder for adding an exponent value, a fixed to floating point number converter at a front end, and a floating to fixed point number converter at a final output end.

Figure 6:
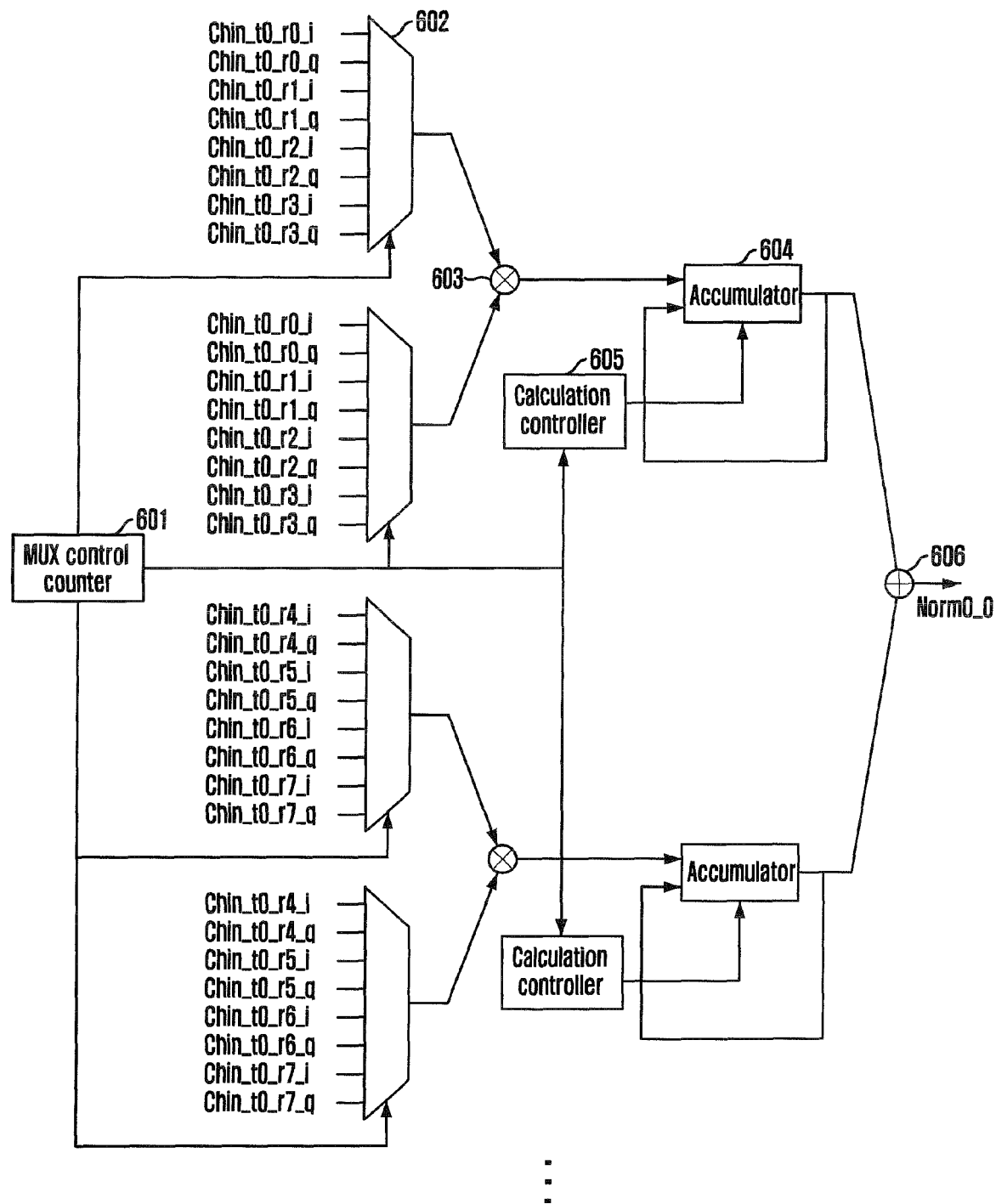
FIG. 6 is a block diagram illustrating a norm calculator in accordance with an embodiment of the present invention.
Figure 11:
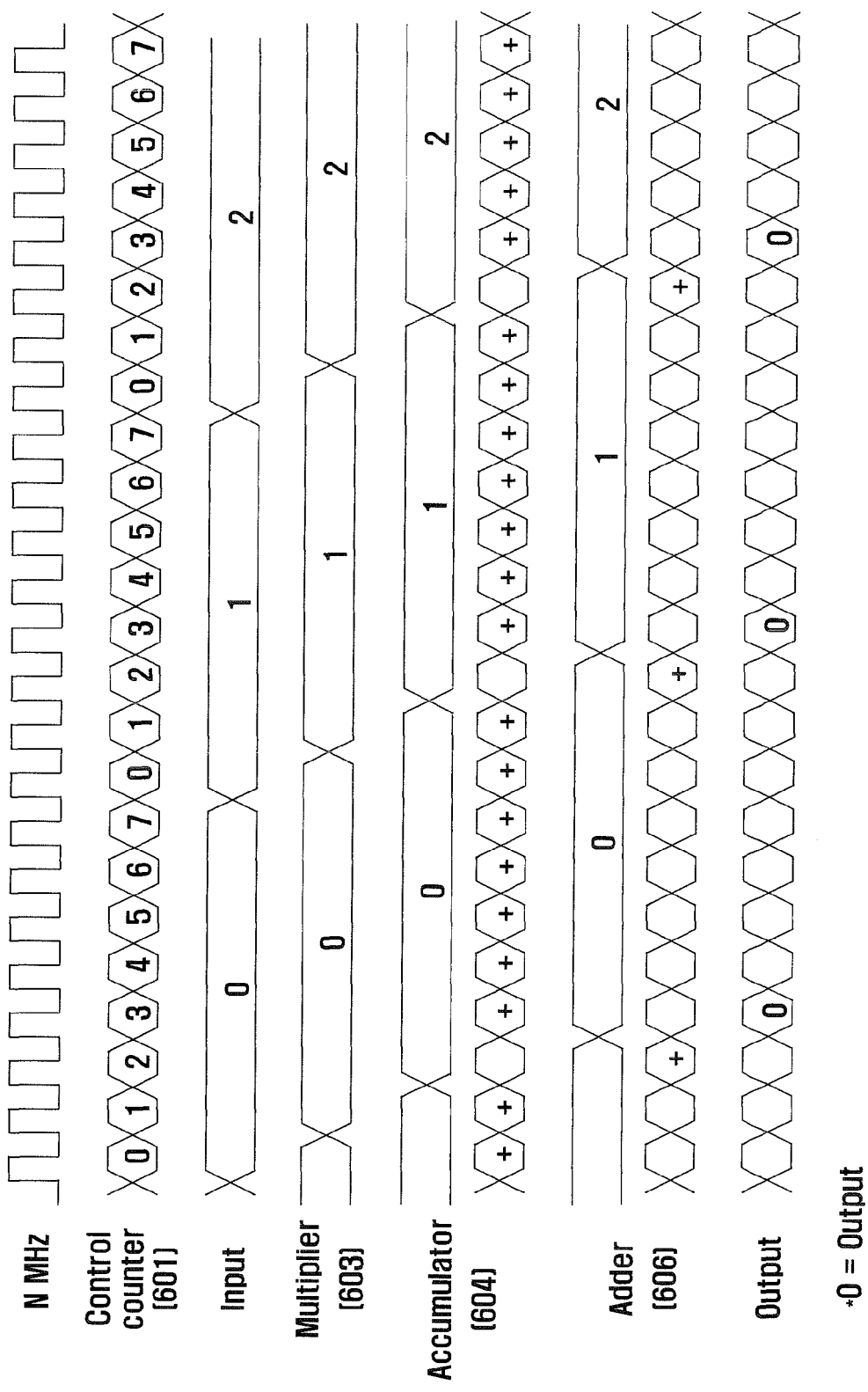
FIG. 11 is an operation timing diagram of a norm calculator in accordance with an embodiment of the present invention.

FIG. 6 is a block diagram illustrating a norm calculator in accordance with an embodiment of the present invention, and FIG. 11 is an operation timing diagram of a norm calculator in accordance with an embodiment of the present invention.

The norm calculator 201 calculates a norm value, a vector size, through sum of square values of estimated channel inputs. In the present embodiment, all of multipliers are shared. Therefore, the estimated channel inputs are sequentially inputted to each of the multipliers 603 one by one through a plurality of multipliers 602.

After the plurality of multiplexers 602, the fixed to floating point number converter may be disposed for converting a fixed point number to a floating point number. In the present embodiment, the plurality of multiplexers 602 select and output one channel input value according to the control of a 3-bits MUX control counter 601. The norm calculator includes a plurality of multipliers, and eight channel inputs share one multiplier 603.

The outputs of multipliers 603 are inputted to corresponding accumulators 604. The accumulators 604 continuously accumulate values inputted from the multipliers 603. Since the inputs of the accumulators 604 are sequentially inputted, the accumulators 604 share an adder. A calculation controller 605 controls the accumulators 604. That is, the calculation controller 605 is operated based on a 3-bit counter and controls a start point of accumulating and an end point of accumulating.

Meanwhile, the norm calculator may further include an adder for adding exponent values outputted from the fixed to floating point number converter. The norm calculator may further include a floating to fixed point number converter for receiving the output of the adder 606 and the output of the adder and converting a floating point number to a fixed point number for the received value.

Figure 7:
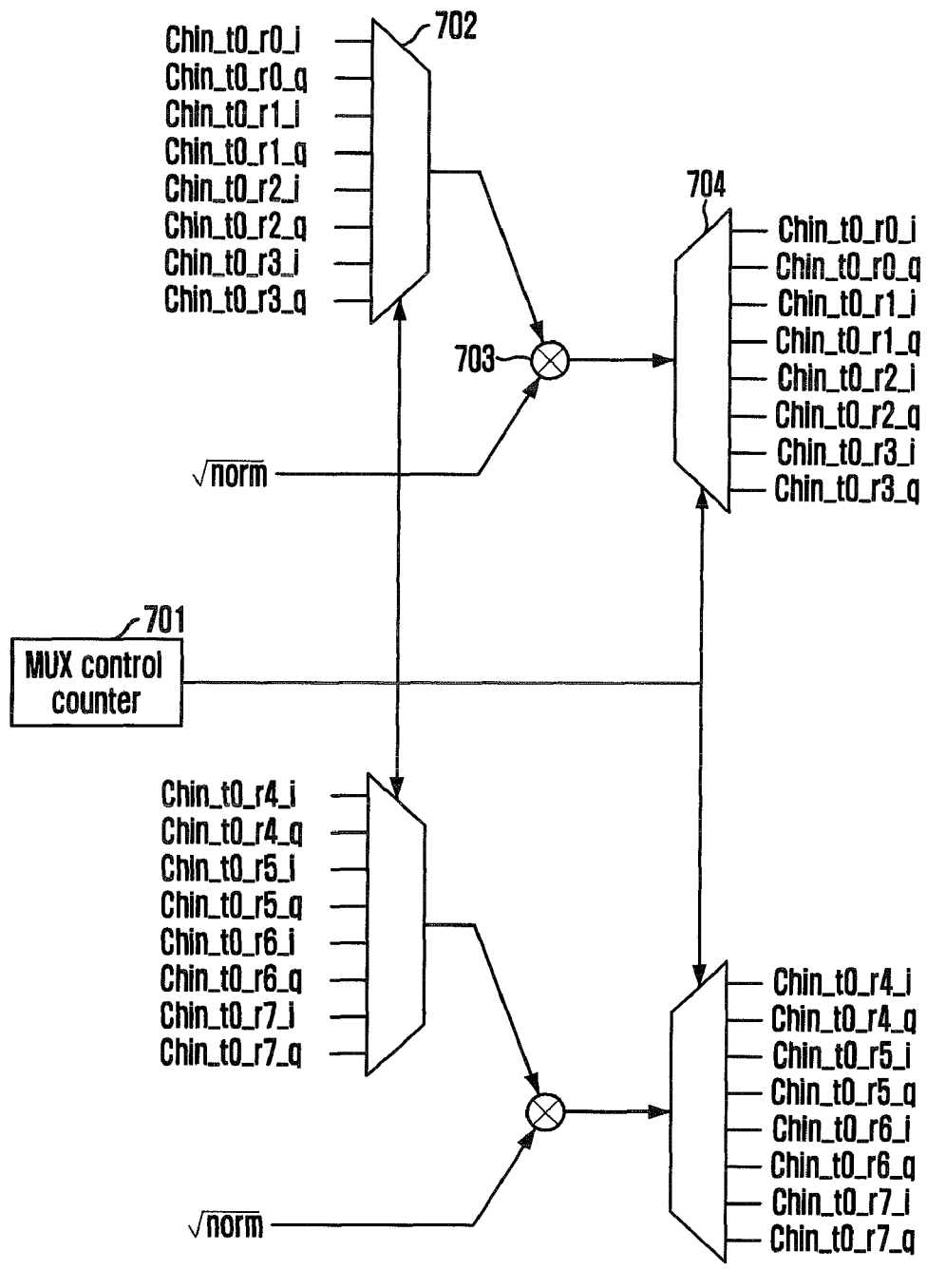
FIG. 7 is a block diagram illustrating a Q column calculator in accordance with an embodiment of the present invention.
Figure 12:
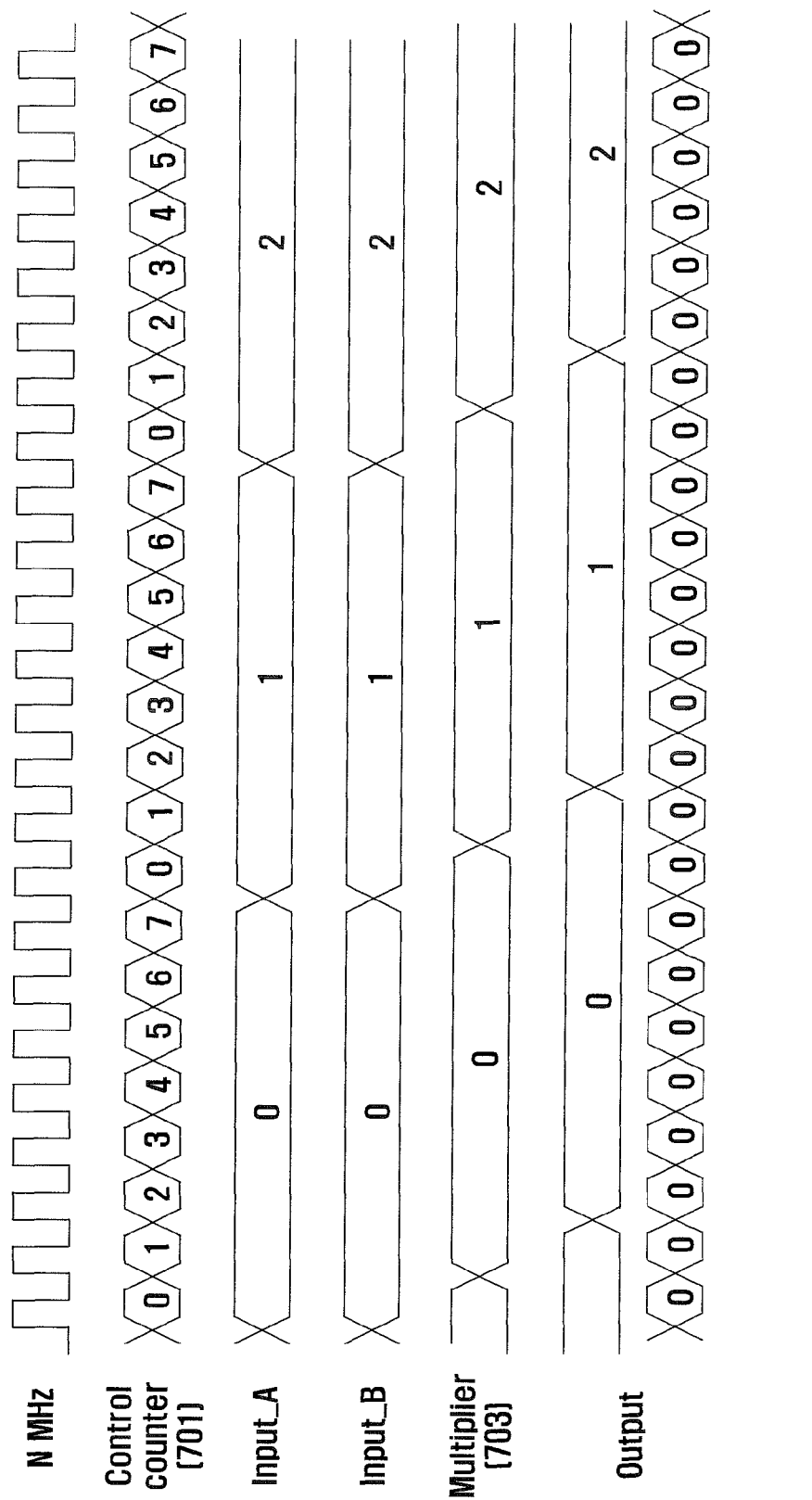
FIG. 12 is an operation timing diagram of a Q column calculator in accordance with an embodiment of the present invention.

FIG. 7 is a block diagram illustrating a Q column calculator in accordance with an embodiment of the present invention, and FIG. 12 is an operation timing diagram of a Q row calculator in accordance with an embodiment of the present invention.

The Q column calculator 206 receives delayed channel inputs and $\sqrt{\text{norm}}$ outputted from the lookup table ROM 203. Here, since $\sqrt{\text{norm}}$ is a fixed value, it is identically transmitted at all time.

A multiplexer 702 selects one of the received channel inputs and inputs the selected one channel input to a multiplier 703. A MUX control counter 701 controls the multiplexer 702 and a demultiplexer. Each of the plurality of multipliers multiplies the selected delayed channel input from the multiplexer 702 with $\sqrt{\text{norm}}$.

The demultiplexer demultiplexes the output of the multiplier 703 and outputs a first Q column value, which is a first column value of a unitary matrix Q. Similarly, the Q column calculator 206 may further include a fixed to floating point number converter, an adder for adding an exponent value, and a fixed to floating point number converter for receiving the outputs of the adder and the multiplier.

Figure 8:
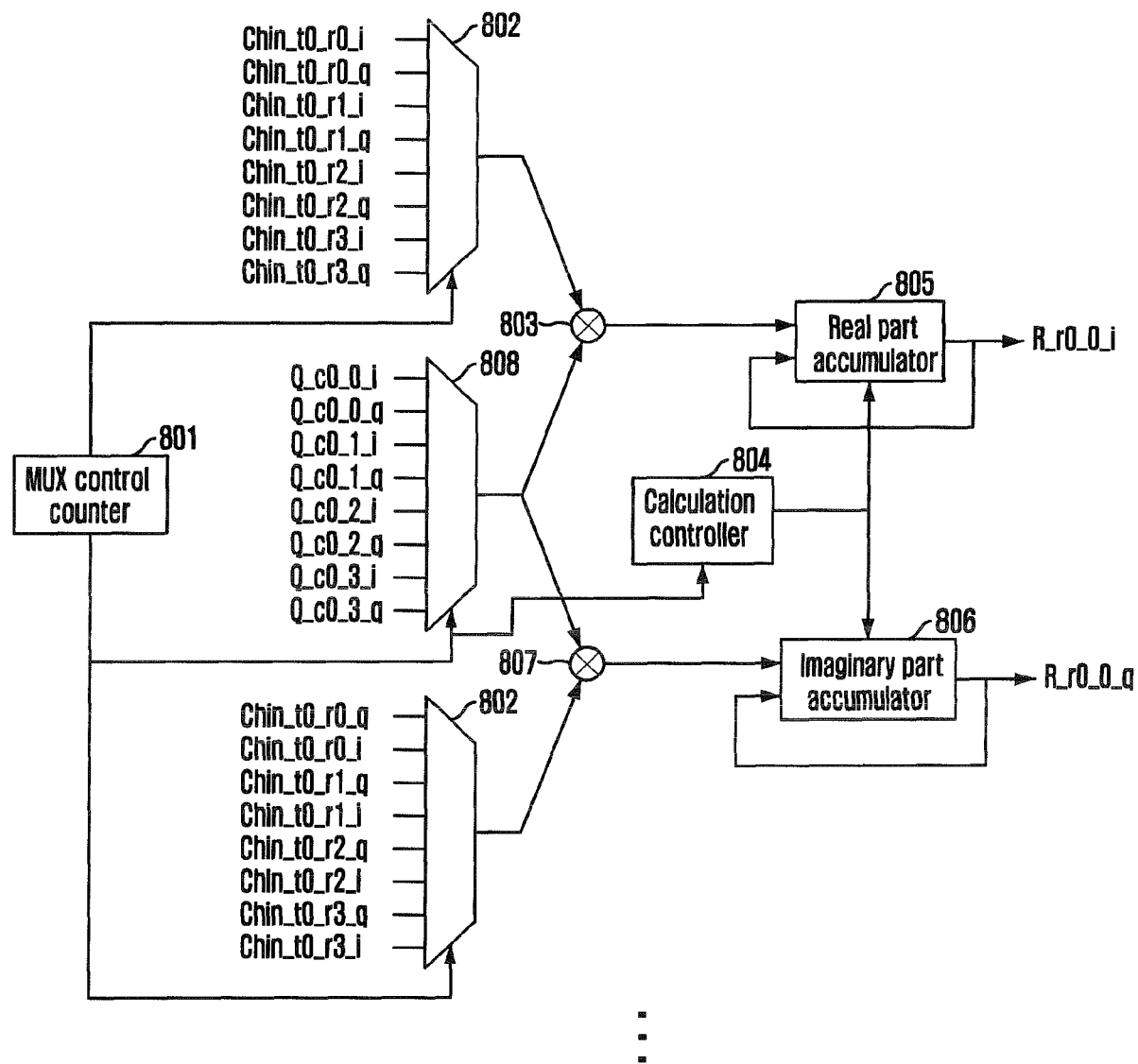
FIG. 8 is a block diagram illustrating a Q row calculator in accordance with an embodiment of the present invention.
Figure 13:
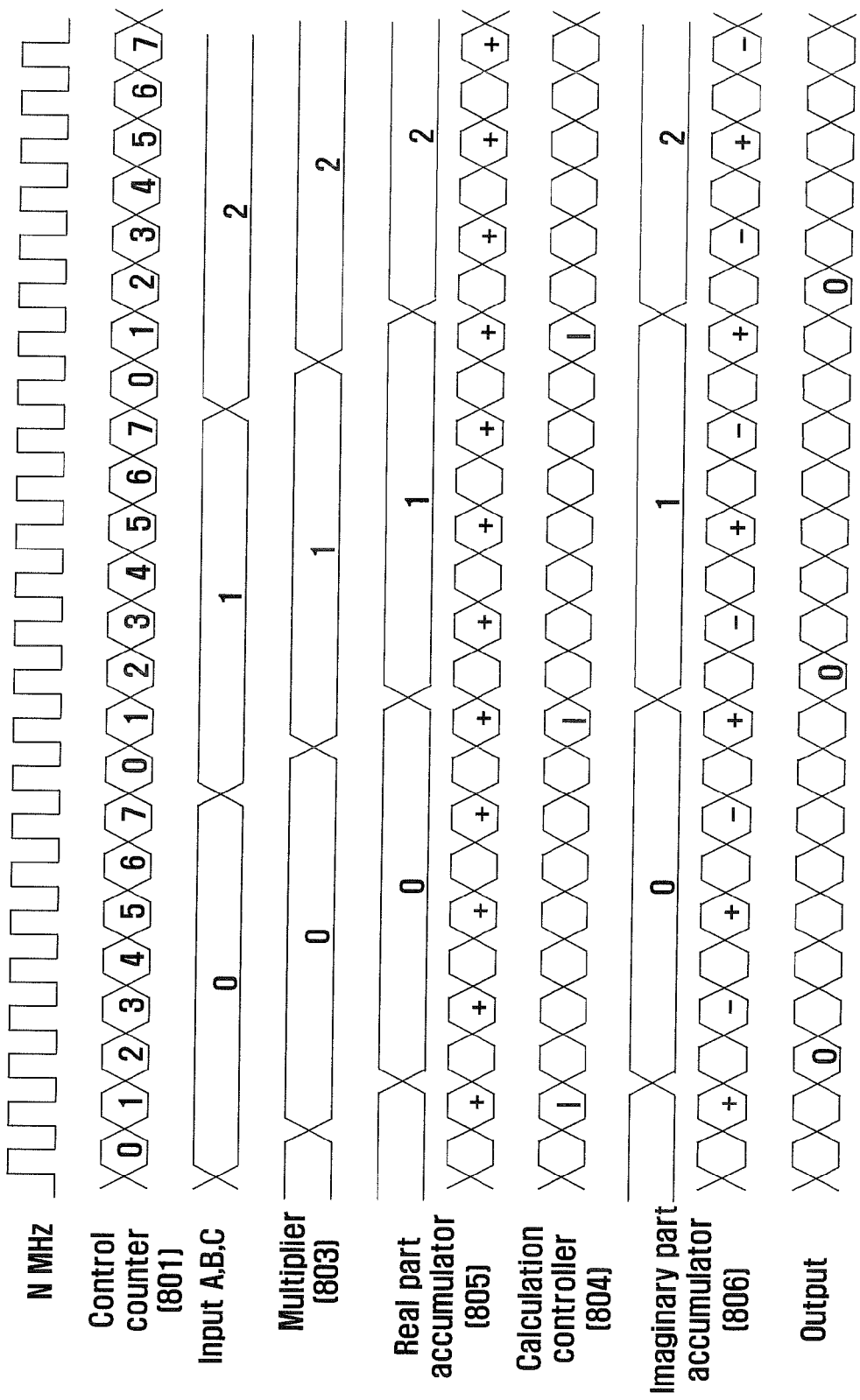
FIG. 13 is an operation timing diagram of a Q row calculator in accordance with an embodiment of the present invention.

FIG. 8 is a block diagram illustrating an R row calculator in accordance with an embodiment of the present invention, and FIG. 13 is an operation timing diagram of an R row calculator.

The R row calculator 209 receives delayed channel inputs and the calculated Q column value of the Q column calculator 206. Since the R row calculator 209 receives a complex signal, a multiplexer 808 selects one of Q column inputs and inputs the selected on to each of multipliers 803 and 507. The delayed channel inputs are inputted in order of real number→imaginary number, and imaginary number→real number by each of the multiplexers 802.

A MUX control counter 801 controls the multiplexers 802 and 808. The multiplier 803 multiplies the real part from the multiplexer 802 with the Q column value of the multiplexer 808. The multiplier 807 multiplies the imaginary part from the multiplexer 802 with the Q column value of the multiplexer 808

A real part accumulator 805 and an imaginary part accumulator 806 alternatively perform +/− operations because of complex number operation. Therefore, a 3-bit calculation controller 804 controls a time of adding and subtracting operations. The output of the accumulators 805 and 806 is the first column value of the upper triangular matrix R.

Figure 9:
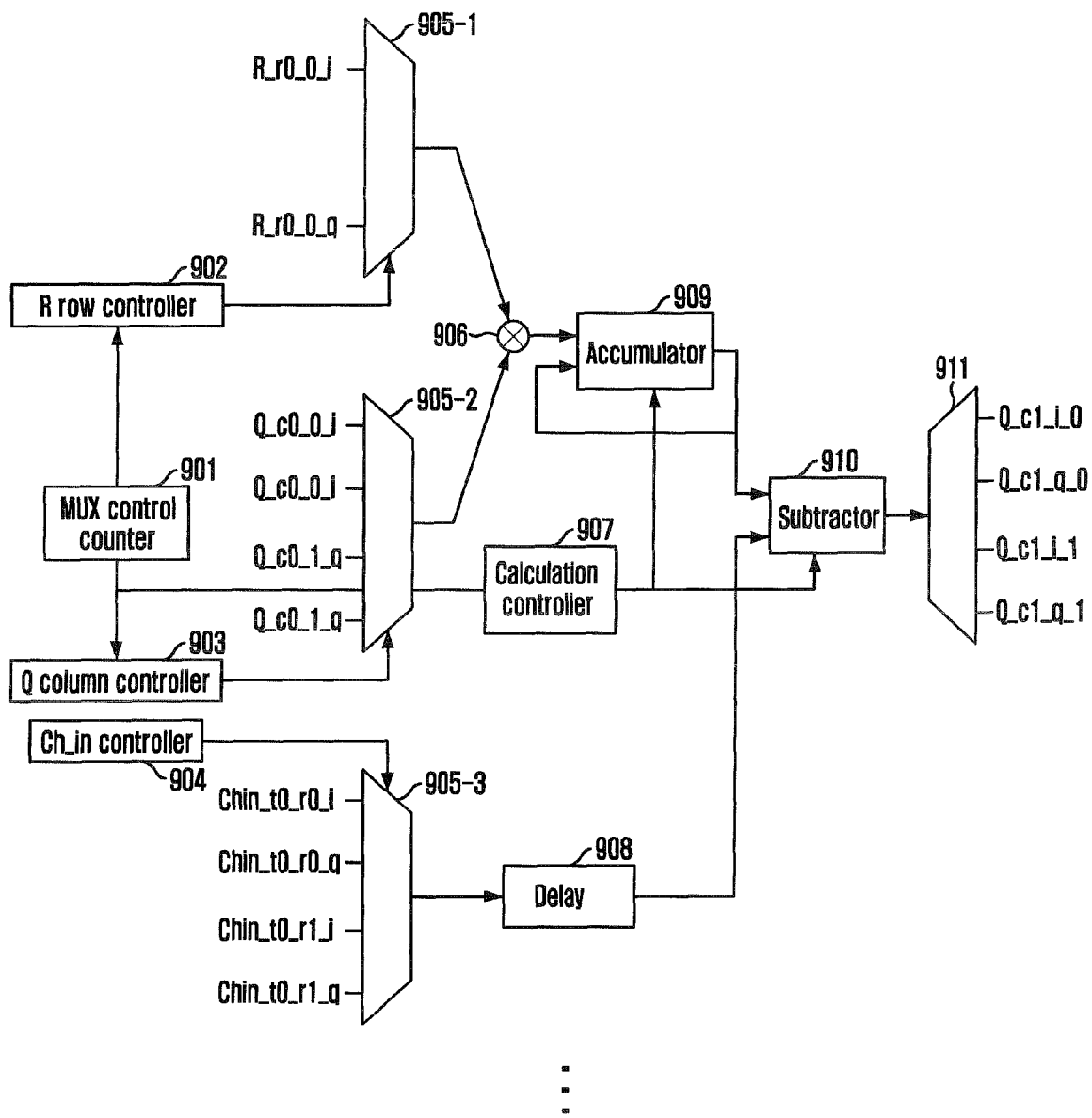
FIG. 9 is a block diagram illustrating a Q update calculator in accordance with an embodiment of the present invention.
Figure 14:
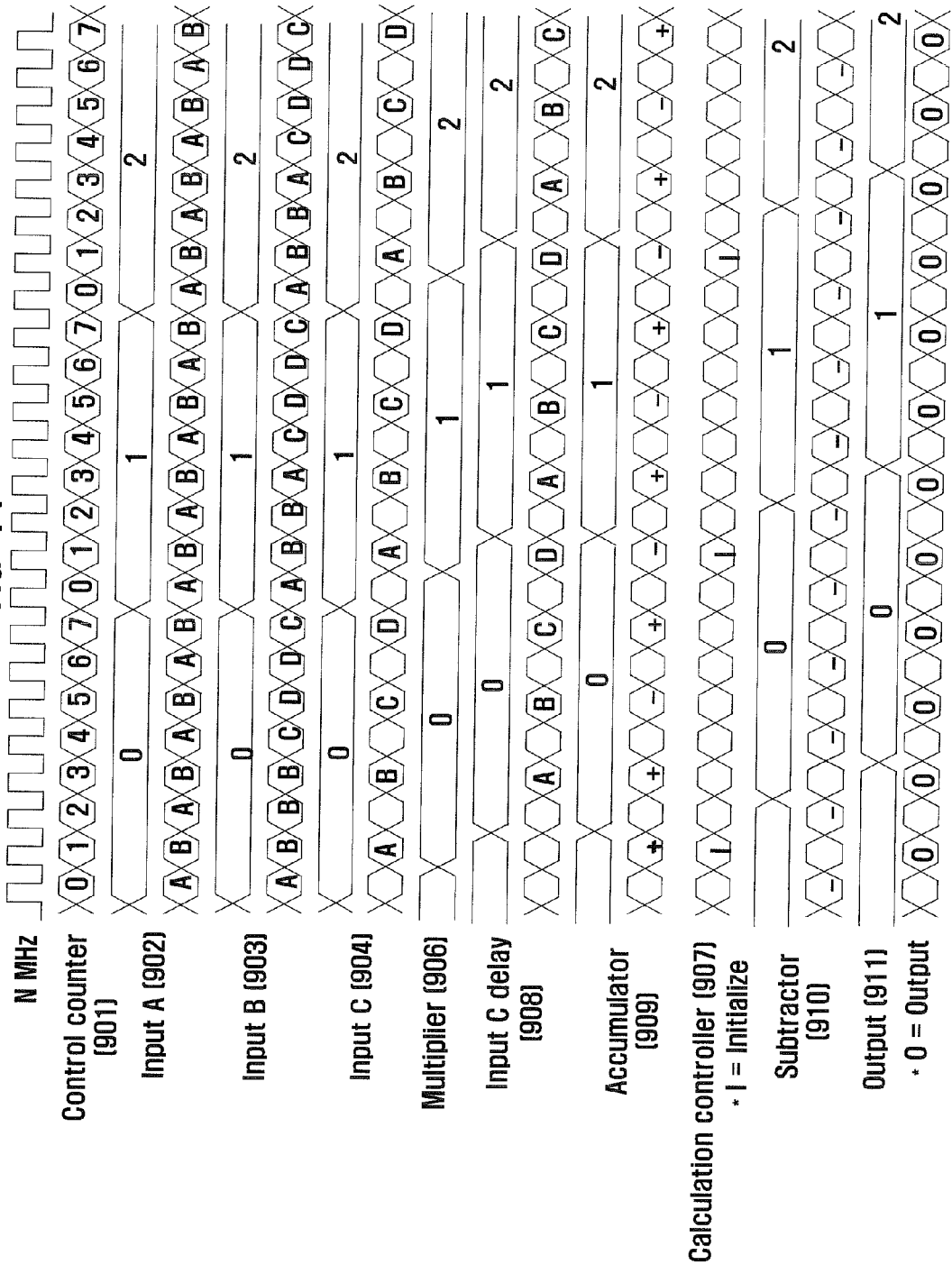
FIG. 14 is an operation timing diagram of a Q update calculator in accordance with an embodiment of the present invention.

FIG. 9 is a block diagram illustrating a Q update calculator in accordance with an embodiment of the present invention, and FIG. 14 is an operation timing diagram of a Q update calculator.

The Q update calculator 211 receives delayed channel inputs, delayed Q column values, and R row values from the R row calculator 209. The R row value is inputted to a multiplexer 905-1, the delayed Q column value is inputted to the multiplexer 905-2, and the delayed channel inputs are inputted to the multiplexer 905-3. Herein, an R row controller 902 controls the selection operation of the multiplexer 905-1, a Q column controller 903 controls the selection operation of the multiplexer 905-2, and a channel input (Ch_in) controller 904 controls the selection operation of the multiplexer 905-3.

Also, the R row controller 902 and the Q column controller 903 receive a MUX control counter and operate according to the received MUX control counter.

The multiplier 906 multiplies an R row value selected by the multiplexer 905-1 with a Q column value selected by the multiplexer 905-2. The output of the multiplier 906 is inputted to an accumulator 909. The accumulator 909 accumulates outputs of the multiplier 906. Here, the accumulator 909 alternatively performs +/− operations by the calculation controller 907 because of complex operations.

The output of the accumulator 909 is inputted to a subtractor 910. The subtractor 910 subtracts the delayed channel input of the delay 908 from the output of the accumulator 909. The subtractor 910 also alternatively performs +/− operations by an calculation controller 907. The demultiplexer 911 demultiplexes the output of the subtractor 910 and outputs a Q update value.

Figure 10:
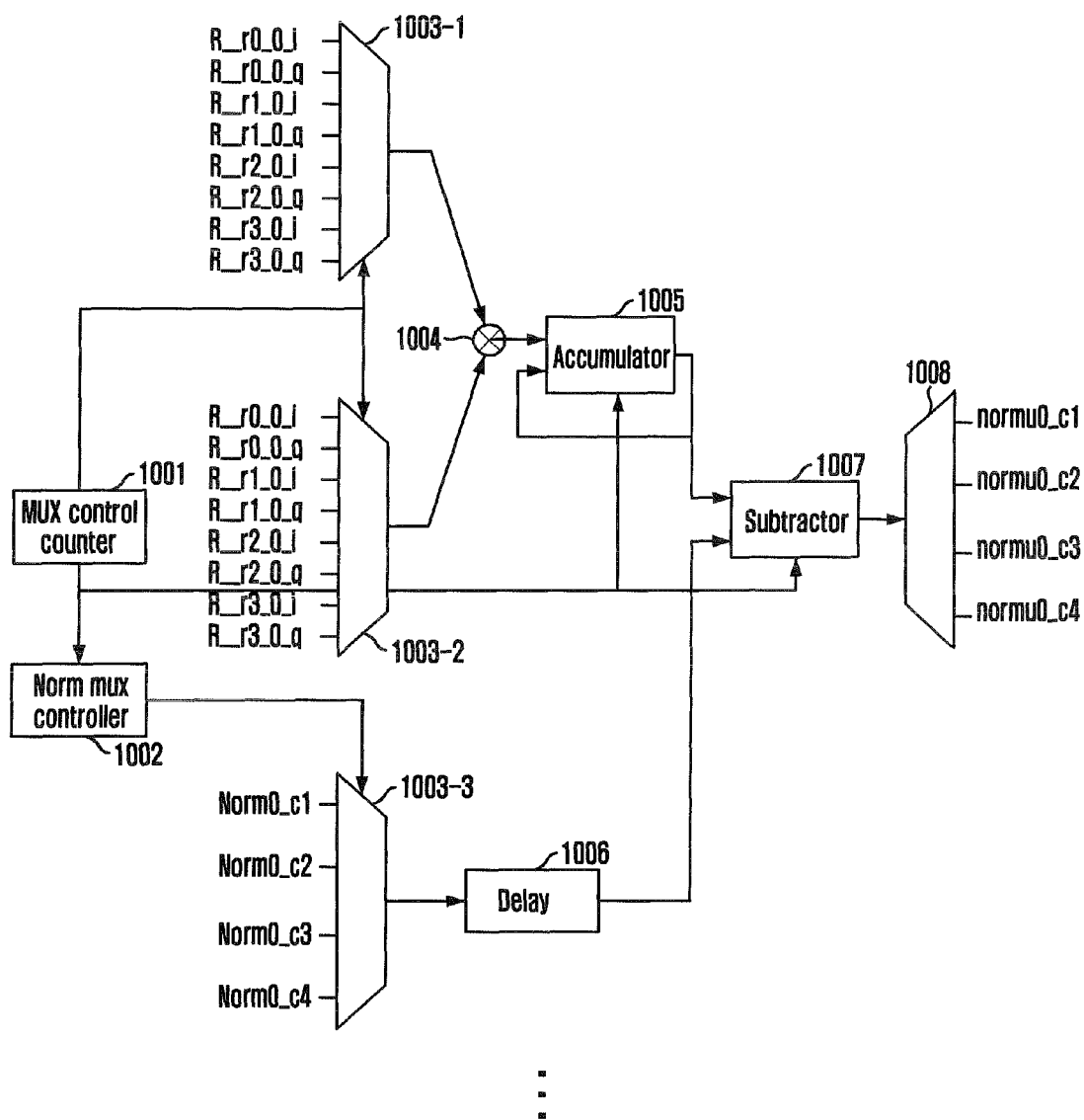
FIG. 10 is a block diagram illustrating a norm calculator in accordance with an embodiment of the present invention.
Figure 15:
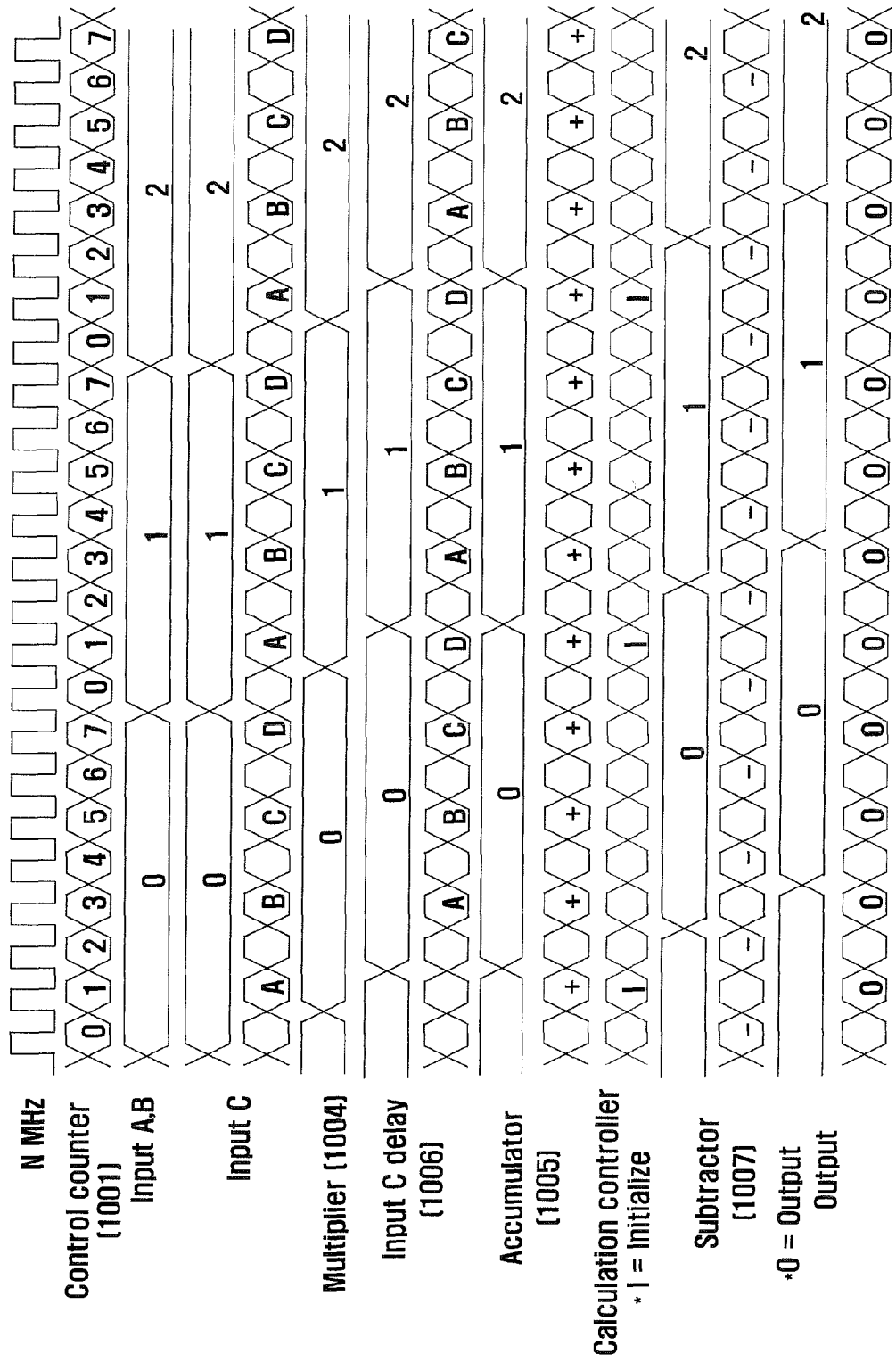
FIG. 15 is an operation timing diagram of a norm update calculator in accordance with an embodiment of the present invention.

FIG. 10 is a block diagram illustrating a norm calculator in accordance with an embodiment of the present invention, and FIG. 15 is an operation timing diagram of the norm update calculator.

The Norm update calculator 212 receives an output of the R row calculator and an output of the norm delay 205. Multiplexers 1003-1 and 1003-2 receive R row values, select one of the received R row values according to the control of a MUX control counter 1001, and output the selected R row value. The multiplexer 1003-3 receives delayed norm values, select one of the received norm values according to the control of a norm MUX controller 1002, and outputs the selected norm value.

A multiplier 1004 multiplies the selected R row value from the multiplexer 1003-1 with the selected R column value from the multiplexer 1003-2. The output of the multiplier 1004 is inputted to an accumulator 1005. The accumulator 1005 accumulates the outputs of the multiplier 1004. Here, the accumulator 1005 alternatively performs +/− operations according to a value of a MUX control counter 1001.

A subtractor 1007 subtracts a delayed norm value from the delay 1006 from the output of the accumulator 1005. The demultiplexer 1008 demultiplexes an output of the subtractor 1007. Here, the subtractor 1007 switches operations according to the control of a MUX control counter 1001.

Meanwhile, the delay is embodied using a shift register In the present embodiment, a SRL primitive in a Xilinx FPGA chip may be used to optimize hardware efficiency.

As described above, the QR decomposition apparatus and method according to the present invention share multipliers, adders, and subtractors for performing the QR decomposition required to decode multiple interference signals in an OFDM MIMO wireless communication system. Therefore, it is possible to simplify a hardware structure.

The QR decomposition apparatus and method, and a calculator for the QR decomposition apparatus according to the present invention also can reduce computation complexity and effectively use hardware by reducing the number of bits in a multiplier using a floating point number processing method.

The method of the present invention described above may be programmed for a computer. Codes and code segments constituting the computer program may be easily inferred by a computer programmer of ordinary skill in the art to which the present invention pertains. The computer program may be stored in a computer-readable recording medium, i.e., data storage, and it may be read and executed by a computer to realize the method of the present invention. The recording medium includes all types of computer-readable recording media.

While the present invention has been described with respect to the specific embodiments, it will be apparent to those skilled in the art that various changes and modifications may be made without departing from the spirit and scope of the invention as defined in the following claims.

What is claimed is:

1. A QR decomposition apparatus for a Multiple Input Multiple Output (MIMO) system, comprising:
    a norm calculating means for calculating a vector size norm for a channel input;
    a Q column calculating means for calculating a column value of a unitary matrix Q by multiplying a delayed channel input with $\sqrt{norm}$;
    an R row calculating means for receiving the delayed channel input, the output of the Q column calculating means, and $1/\sqrt{norm}$, and calculating a row value of an upper triangular matrix R;
    a Q update calculating means for receiving the delayed channel input, the output of the R row calculating means, and a delayed output of the Q column calculating means, and calculating a Q update matrix value; and
    a norm update calculating means for receiving a delayed output of the norm calculating means and an output of the R row calculating means, and outputting a norm update matrix value.

2. The QR decomposition apparatus of claim 1, further comprising:
    a first memory means for receiving an output of the norm calculating means and outputting the $\sqrt{norm}$ using a lookup table; and
    a second memory means for receiving an output of the norm calculating means and outputting the $1/\sqrt{norm}$ using a lookup table.

3. The QR decomposition apparatus of claim 2, further comprising:
    a first delay means for delaying and outputting the channel input;
    a second delay means for delaying and outputting an output of the norm calculating means; and
    a third delay means for delaying and outputting an output of the Q column calculating means.

4. The QR decomposition apparatus of claim 3, wherein the norm calculating means output the vector size norm by squaring channel input values selected from the plurality of channel inputs and adding the squares together.

5. The QR decomposition apparatus of claim 4, wherein the norm calculating means includes:
    a plurality of multiplexing means for selecting one of the plurality of channel inputs;
    a plurality of multiplying means for multiplying the selected channel input values from the plurality of multiplexers;
    a plurality of accumulating means for accumulating outputs from the plurality of multipliers;
    an operation controlling means for controlling operation of the plurality of accumulating means; and
    an adding means for adding outputs of the plurality of accumulating means.

6. The QR decomposition apparatus of claim 3, wherein the Q column calculating means outputs a column value of a unitary matrix Q by multiplying the delayed channel inputted from the first delay means and the output of the first memory means.

7. The QR decomposition apparatus of claim 6, wherein the Q column calculating means
    a plurality of multiplexing means for selecting a delayed channel input from the first delay means;
    a plurality of multiplying means for multiplying outputs of the plurality of multiplexing means with an output of the first memory means; and
    a de multiplexing means for de-multiplexing outputs of the plurality of the multiplying means and outputting a column value of an unitary matrix Q.

8. The QR decomposition apparatus of claim 3, wherein the R row calculating means outputs an R row value by multiplying a real part of a delayed channel input of the first delay means with an output of the Q column calculating means, multiplying an imaginary part of a delayed channel input from the first delay means with an output of the Q column calculating means, and accumulating the multiplied real parts and the multiplied imaginary parts.

9. The QR decomposition apparatus of claim 8, wherein the R row calculating means includes:
    a plurality of first multiplexing means for selecting a delayed channel input from the first delay means;
    a second multiplexing means for selecting an output of the Q column calculating means;
    a first multiplying means for multiplying a real part of the first multiplexing means with an output of the second multiplexing means;
    a second multiplying means for multiplying an imaginary part of the first multiplexing means with an output of the second multiplexing means;
    a real part accumulating means for accumulating outputs of the first multiplying means;
    an imaginary part accumulating means for accumulating outputs of the second multiplying means; and
    an operation controlling means for controlling operations of the real part accumulating means and the imaginary part accumulating means.

10. The QR decomposition apparatus of claim 3, wherein the Q update calculating means outputs a Q update matrix value by performing complex operation on a delayed Q column value from the third delay means and an output of the R row calculating means and subtracting a delayed channel input of the first delay means from the complex operation result.

11. The QR decomposition apparatus of claim 10, wherein the Q update calculating means includes:
    a first multiplexing means for selecting a Q column value delayed by the third delay means;
    a second multiplexing means for selecting an output of the R row calculating means;
    a multiplying means for multiplying an output of the first multiplexing means and an output of the second multiplexing means;
    an accumulating means for complex accumulating for an output of the multiplying means;

a subtracting means for subtracting a delayed channel input of the first delay means from an output of the accumulating means; and an operation control means for controlling complex operation of the accumulating means and the subtracting means; and a demultiplexing means for outputting a Q update matrix value by demultiplexing outputs of the subtracting means.

12. The QR decomposition apparatus of claim 3, wherein the norm update calculating means outputs a norm update matrix value by performing complex operation on an operation of the R row calculating means and subtracting a delayed norm value of the second delay means from the complex operation result.

13. The QR decomposition apparatus of claim 12, wherein the norm update calculating means includes:

a first and second multiplexing means for selecting outputs of the R row calculating means;

a multiplying means for multiplying the outputs of the first and second multiplexing means;

an accumulating means for accumulating outputs of the multiplying means;

a subtracting means for subtracting a delayed norm value of the second delay means from the result of the accumulating means;

an operation controlling means for controlling complex operation of the accumulating means and the subtracting means; and a demultiplexing means for outputting a norm update matrix value by demultiplexing an output of the subtracting means.

14. The QR decomposition apparatus of claim 3, further comprising:

a fixed to floating point number converting means for converting a fixed point number type input to a floating point number and inputting a significant value to a multiplier in order to reduce bit numbers inputted to the multiplier;

an adding means for adding an exponent of the fixed to floating point number converting means; and a floating to fixed point number converting means for converting a floating point number to a fixed point number using a result calculated using the significant value and the exponent value from the adding means.

15. A QR decomposition method for a Multiple Input Multiple Output (MIMO) system, comprising:

calculating, by a device, a vector size norm for a channel input;

calculating a column value of a unitary matrix Q using a delayed channel input and $\sqrt{norm}$;

calculating a row value of an upper triangular matrix R using the delayed channel input, the calculated column value of the unitary matrix Q, and $1/\sqrt{norm}$;

calculating a Q update matrix value using the delayed channel input, the calculated row value of the upper triangular matrix R, and a delayed column value of the unitary matrix Q; and calculating a norm update matrix value using a delayed norm value and the calculated row value of the triangular matrix value.

16. The method of claim 15, wherein $\sqrt{norm}$ and $1/\sqrt{norm}$ are calculated using a lookup table.

17. The method of claim 15, wherein in said calculating a vector size norm, the vector size norm is calculated by squaring channel input values selected from the plurality of channel inputs and adding the squaring values together.

18. The method of claim 15, wherein in said calculating a column value, the column value is calculated by multiplying the delayed channel input with $\sqrt{norm}$.

19. The method of claim 15, wherein said calculating a row value includes:

multiplying a real part of the delayed channel input with the column value of the unitary matrix Q;

multiplying an imaginary part of the delayed channel input with the column of the unitary matrix Q; and calculating an row value of an upper triangular matrix R by accumulating the multiplied real parts and the multiplied imaginary parts.

20. The method of claim 15, wherein said calculating a Q update matrix value includes:

performing complex operation on the delayed column value of the unitary matrix Q and the row value of the upper triangular matrix R; and calculating a Q update matrix value by subtracting the complex operation result from the delayed channel input.

21. The method of claim 15, wherein in said calculating a norm update matrix value, a norm update matrix value is calculated by performing complex operation on the row value of the upper triangular matrix R and subtracting the complex operation result from the delayed norm value.

22. The method of claim 15, further comprising:

converting a fixed point number type input to a floating point number in order to reduce a number of bits inputted to a multiplying operation;

performing a predetermined operation using a significant value and adding an exponent; and converting a floating point number type into a fixed point number type using the result of the predetermined operation and the added exponent.

* * * * *